United States Patent [19]
Wiese

[11] Patent Number: 5,361,183
[45] Date of Patent: Nov. 1, 1994

[54] GROUND FAULT PROTECTION FOR ELECTROTHERMAL DE-ICING APPLICATIONS

[75] Inventor: Earl G. Wiese, Oakville, Canada

[73] Assignee: AlliedSignal Inc., Morris Township, N.J.

[21] Appl. No.: 85,574

[22] Filed: Jun. 30, 1993

[51] Int. Cl.$^5$ .............................................. H02H 9/02
[52] U.S. Cl. ........................................ 361/42; 361/46
[58] Field of Search ............................ 361/42–50, 361/93; 219/203, 522, 485; 244/134 A, 134 D, 134 R

[56] References Cited

U.S. PATENT DOCUMENTS 3,800,121   3/1974   Dean et al. ..................... 219/522

*Primary Examiner*—Jeffrey A. Gaffin
*Assistant Examiner*—Ronald W. Leja
*Attorney, Agent, or Firm*—Verne E. Kreger, Jr.

[57] ABSTRACT

An electrical circuit that provides ground fault protection by compensating for the capacitive leakage current between an electrothermal de-icing system bonded to an aircraft surface. A conductive shield is interposed between the resistive heater element of the de-icing system and the grounded aircraft surface to control the path of the capacitive leakage current. The leakage current is directed to a primary coil of the GFI transformer where it is summed with the heater element return current. The resultant is compared with the heater element load current. If the load current equals the summation of the leakage current and the return current, the circuit remains operational; if the load current exceeds the summation of the leakage current and the return current by a threshold limit, the load current is interrupted.

5 Claims, 3 Drawing Sheets

GROUND FAULT PROTECTION FOR ELECTROTHERMAL DE-ICING APPLICATIONS

FIELD OF THE INVENTION

This invention relates to electrical circuit ground-fault protection, and in particular, ground fault protection for electrothermal de-icing systems.

BACKGROUND OF THE INVENTION

Ground Fault Interrupter (GFI) circuits are used in applications where a potential electric shock hazard exists, and are designed to interrupt the electrical load current should an individual inadvertently contact an exposed conductor. The sensing portion of the GFI circuit operates as shown in FIG. 1. Two primary windings on the GFI transformer are phased such that, when the load current ($I_1$) and the return current ($I_2$) are equal, the two fluxes cancel, and the induced current in the transformer secondary fed to the threshold detector is essentially zero.

Should someone touch an exposed portion of the load circuit and complete a path to ground, as shown in FIG. 2, the load current will be greater than the return current by an amount equal to the shock current ($I_3$) through the victim. Expressed mathematically, $I_1 = I_2 + I_3$. Under this condition, $I_1$ and $I_2$ are no longer equal, and their fluxes will not cancel. A current, proportional to $I_3$, will be induced into the secondary winding of the GFI transformer. This induced current, $I_3$, may then be compared to a predetermined threshold level, and, if determined to be excessive, can initiate an immediate removal of power by opening a relay, contactor, or semiconductor switch.

The ground fault detection circuit described above operates well for most applications, and has been in widespread use for many years. A problem has been discovered, however, when a physically large resistive load is installed very close to a large grounded metal surface. One example of this type of installation is an electrothermal de-icing system bonded to the wing of an aircraft where the size of the resistive heating element is almost the same size as the bonding surface. A resistive heater structure for use in an electrothermal de-icing system is described in U.S. Pat. No. 4,942,078 issued to Newman et al., incorporated herein by reference. Newman et al. teach a plurality of layers of structural fabric which have been treated and prepared with a laminating resin and cured into a laminate structure. At least one of the layers of fabric is rendered conductive by being treated with conductive polymer. The use of non-woven, nickel-plated carbon fiber cloth is another alternative material for use in an electrothermal de-icing system. A typical non-woven web is described in U.S. Pat. No. 4,534,886 issued to Kraus et al., incorporated herein by reference. Kraus et al. teach an electrically conductive non-woven web which contains both conductive fibers and conductive particles. In a common embodiment, the non-woven heater element would be encapsulated between layers of an adhesive impregnated cloth. The most common cloth would be fiberglass, either woven or non-woven. A commercially available conductive fiber for use as an electrothermal de-icing system is manufactured by Technical Fibre Products, Ltd. located in Kendal England.

In an electrothermal de-icing system assembly, the resistive heater element and the wing form the two plates of a parallel plate capacitor, and the insulation between the plates acts as the dielectric as shown schematically in FIG. 3. Once the electrothermal system is installed, the dielectric strength of the insulator may be very good, and the resistive leakage current from the heater to the wing may be negligible. However, a small but significant alternating current can flow through the unwanted capacitor to the grounded surface. This capacitive leakage current, $I_4$, can unnecessarily trigger a ground fault interrupter installed on the system, even when no shock current, $I_3$, is present. Simply raising the threshold level in the GFI is not a practical solution to the problem because the capacitance of the unwanted capacitor is not well controlled and is, therefore, not predictable. Furthermore, the safety of maintenance workers is of prime importance, and any suggestion of compromising the safety of the workers may raise serious safety concerns.

Generally, other possible solutions utilizing alternate current sensing devices are not viable in a de-icing application. The capacitance between the heater assembly and the wing is not adequately predictable because it is a function of the adhesive thickness and temperature. The adhesive thickness varies with the installation, and the capacitance can change up to 20% over the heater's normal temperature range.

It is therefore an object of the invention to provide a safe and reliable ground fault interrupter circuit for electrothermal de-icing applications.

It is a further object of the present invention to provide a reliable ground fault protection device that works independently of the capacitance between the heater and the wing.

SUMMARY OF THE INVENTION

The present invention seeks to overcome the above-stated problems by providing a ground fault interrupter assembly that compensates for the unwanted capacitance between the electrothermal de-icing system and the aircraft wing.

In the preferred embodiment, the invention comprises an insulated shield layer added to the de-icing assembly to control the path of the capacitive leakage current. The leakage current is directed to a primary coil of the GFI transformer where it is summed with the return current. The resultant is compared with the load current. If the load current equals the summation of the leakage current and the return current, the circuit remains operational; if the load current exceeds the summation of the leakage current and the return current over a threshold limit, the load current is interrupted.

BRIEF DESCRIPTION OF THE DRAWINGS

The above and other objects and advantages of this invention will be apparent on consideration of the following detailed description, taken in conjunction with the accompanying drawings, in which like reference characters refer to like parts throughout, and in which.

DETAILED DESCRIPTION OF THE INVENTION

Figure 1:
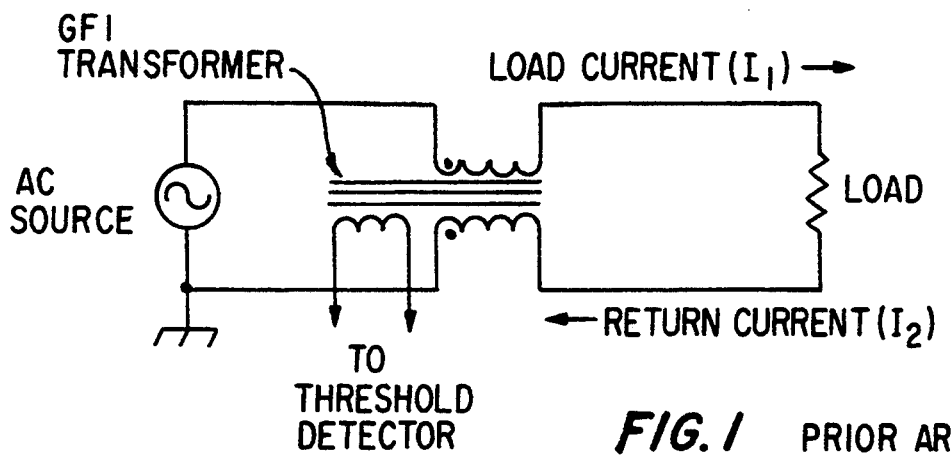
FIG. 1 is an electrical schematic of a typical ground fault detection circuit.
Figure 2:
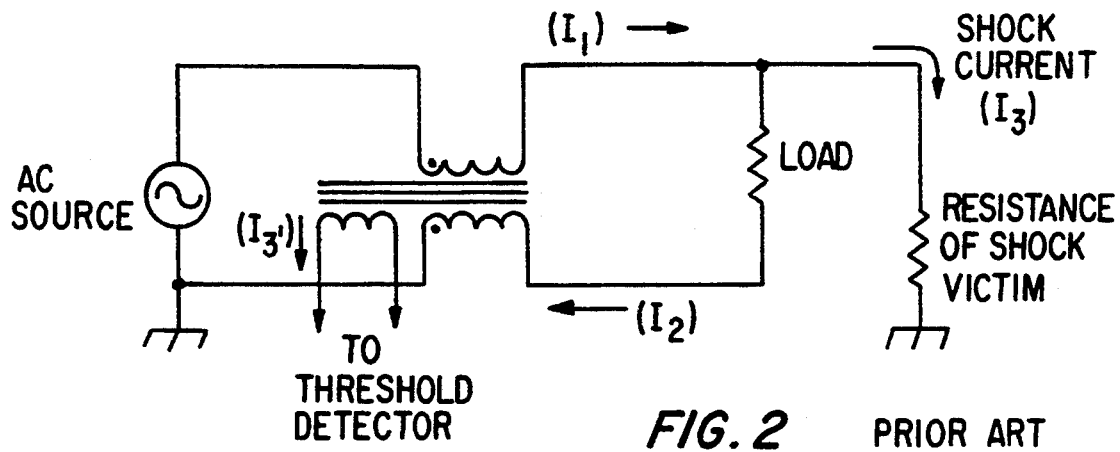
FIG. 2 is an electrical schematic of FIG. 1 further illustrating the path of the shock current.
Figure 3:
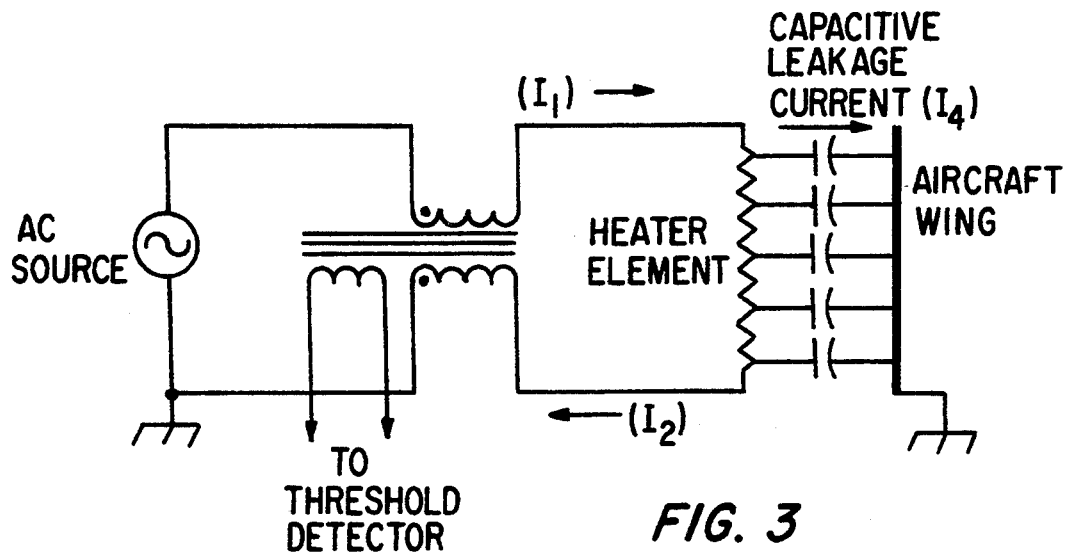
FIG. 3 is an electrical schematic of the problem addressed by the invention.
Figure 4:
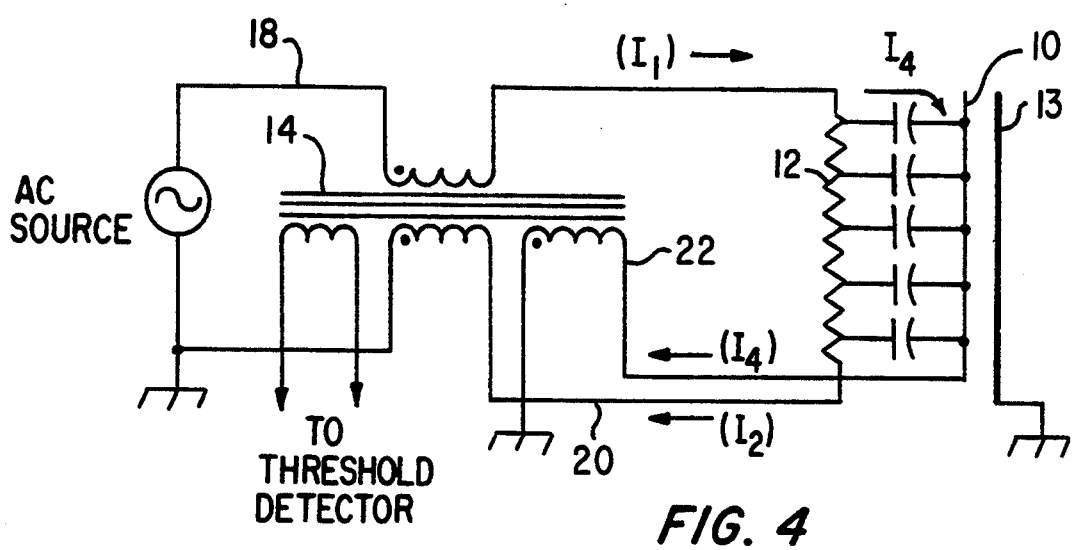
FIG. 4 is an electrical schematic of a ground fault detection circuit employing the invention.
Figure 5:
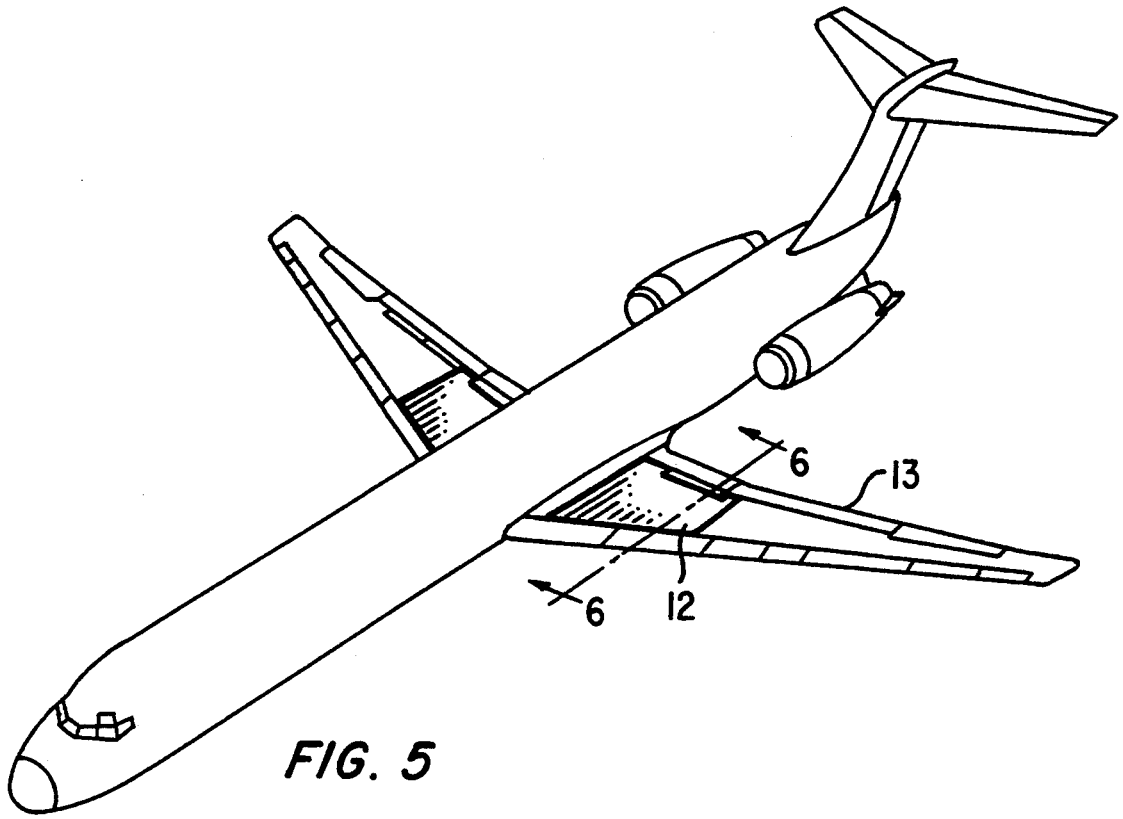
FIG. 5 shows an application of an electrothermal de-icing system.
Figure 6:
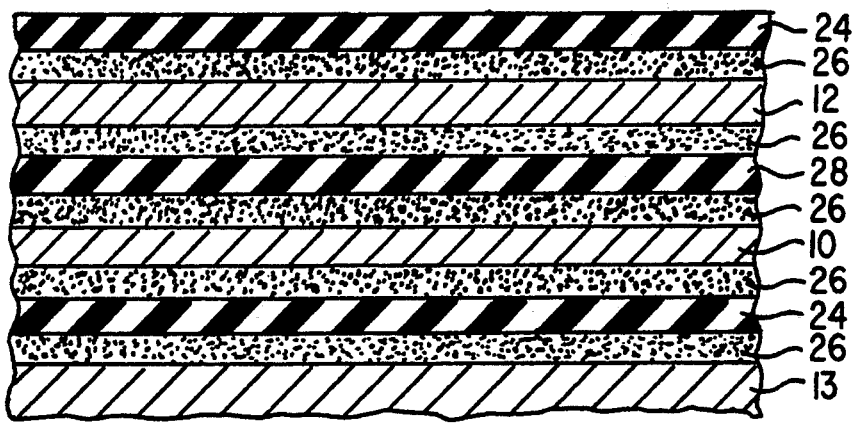
FIG. 6 is an exaggerated elevation view of an electrothermal de-icing system employing a portion of the invention.

FIG. 4 illustrates an electrical circuit representation of an insulated shield layer 10 added to an electrothermal de-icing assembly comprising an insulated distributed resistive heater element 12. The de-icing assembly is installed in an overlapping relationship with a aircraft surface, such as a wing 13 as shown in FIG. 5. The de-icing assembly may cover an entire aircraft surface, such as a leading edge, or it may only cover a portion of a surface, depending on the de-icing parameters. The location of shield layer 10 in relation to heater element 12 and wing surface 13 is shown in FIG. 6. The surface area dimensions of shield layer 10 closely approximate the surface area dimensions of the heater element 12. The shield layer 10 should be as physically close to the heater element 12 as possible, while still maintaining a high dielectric separation and at the same time minimizing the capacitance between the shield 10 and wing surface 13. Heater 12 and shield 10 are sandwiched between multiple layers of an insulator 24, preferably a fiberglass cloth, and an adhesive 26 and bonded to wing 13. Disposed between heater 12 and shield 10 is a dielectric material 28 to provide a dielectric of about 4000 V. Preferably, the dielectric material is a 1 mil thick polyimide film, such as Apical ®, manufactured by Allied-Signal Inc. of Morristown, N.J. The shield layer 10 and the wing 13, separated by an insulating layer 24, formanother capacitor, but since both plates of this capacitor are at ground potential, no current will flow.

Shield layer 10 controls the path of the capacitive leakage current $I_4$ that flows from the heater element 12 to wing 13 by conducting $I_4$ to a sensing means, such as a current transformer. Example 1, below, discloses potential values of $I_4$ calculated from experimental capacitance meter readings. Preferably, shield layer 10 is a highly conductive layer which may be constructed from the same material as used to make the conductive layer of the heater element or a metal foil, such as copper or aluminum.

Referring to FIG. 4, perferably GFI transformer 14 comprises a toroid secondary in which a current is induced whenever an unbalanced current flows in the primaries of the transformer 14. The primaries of transformer 14 comprise three single wires running through the center of the toroid secondary. Wire 18 carries current $I_1$, wire 20 carries current $I_2$ and wire 22 carries current $I_4$. In this configuration, capacitive leakage current $I_4$ flows from resistive heating element 12 to shield layer 10, then to ground via primary winding wire 22 of the GFI transformer 14. Under proper operating conditions, $I_1 = I_2 + I_4$, which maintains effective flux cancellation, allowing the GFI circuit to operate as intended.

Figure 7:
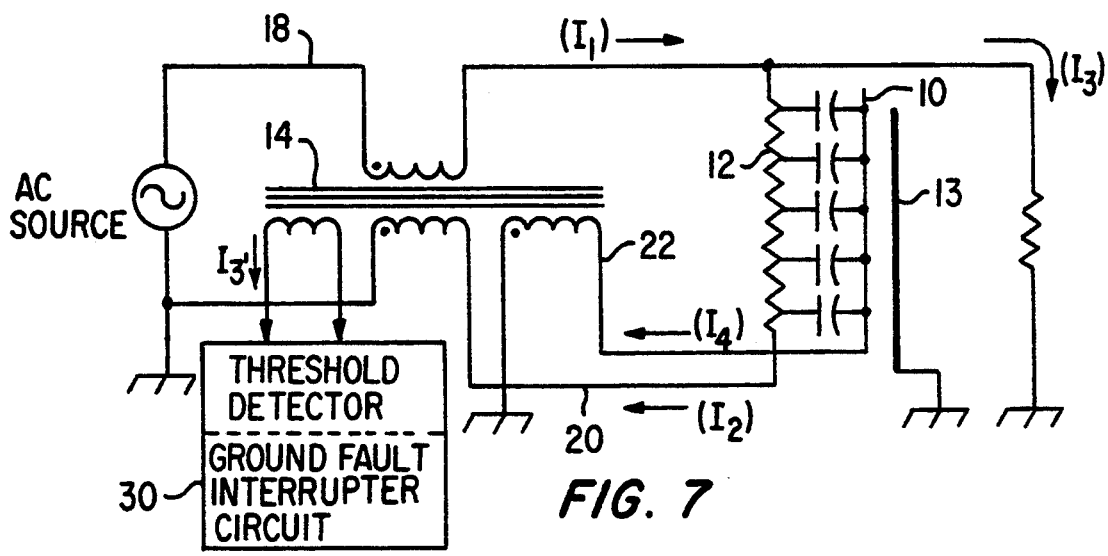
FIG. 7 is an electrical schematic of FIG. 4, further illustrating the path of the shock current.

FIG. 7 illustrates a fault condition where shock current $I_3$ is not sensed by transformer 14. In this case $I_1 > I_2 + I_4$, resulting in an unbalanced flow of current, which causes a current proportional to shock current $I_3$ to be induced in the secondary of transformer 14. The induced current $I_3$, is input into a ground fault interrupter circuit (30), as is known to those familiar in the art. One type of GFI circuit may comprise an electronic semiconductor chip, such as Ground Fault Interrupter chip LM 1851, manufactured by National Semiconductor. The output of the chip drives an interrupting relay (not shown) that opens the electrical circuit when a ground fault is detected, as is well known in the art.

Figure 8:
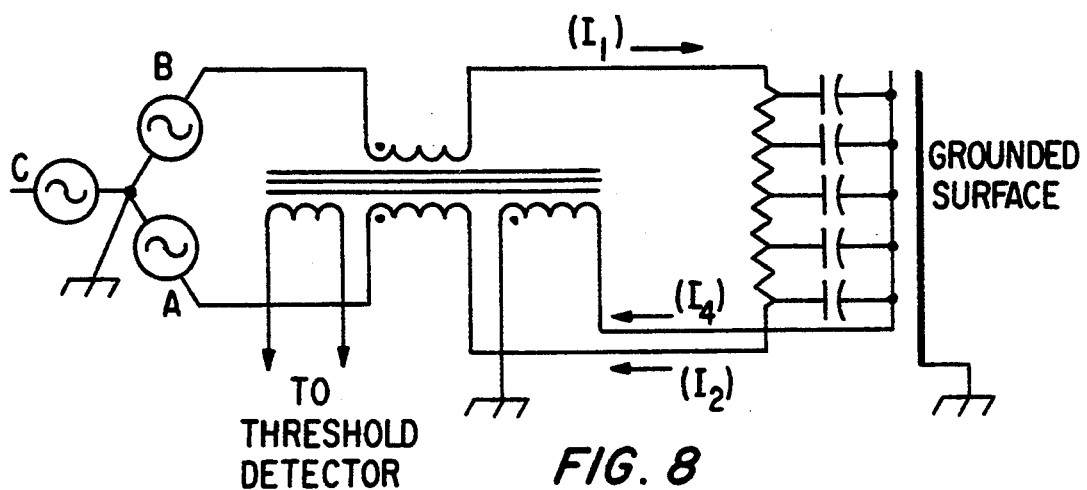
FIG. 8 is an electrical schematic of an alternate use of the invention.

For ease of understanding, the basic GFI circuit, the problem, and the solution were all described for a single phase source and load. A similar situation can occur on three phase systems, or when a single phase load is connected to two phases on a grounded neutral three phase system as shown in FIG. 8.

EXAMPLE NO. 1

Measurement of Capacitive Leakage Current

A capacitance meter was set up to measure the capacitance between a conductive non-woven material having three layers of fiberglass insulation on the top and bottom and an aluminum plate representing an aircraft wing. The measured results and calculations are as follows:

$$\frac{nF}{in^2} = \frac{12\ nF}{6'' \times 18''} \text{ (measured)} = 0.111\ nF/in^2$$

Assume that the maximum size of the electrothermal de-icing assembly is 2,400 $in^2$:

$$\text{Capacitance} = 2,400\ in^2 \times 0.111\ nF/in^2 = 266\ nF$$

Leakage current $I_4$ at 400 Hz, 115 VAC (electrical operating power of conventional aircraft):

$$Z = \frac{1}{2\pi f C} = \frac{1}{2\pi(400)\ (2.66\ 10^{-7})} = 1495\Omega$$

$$I_4 = \frac{115\ V}{1495\Omega} = 76.9\ ma$$

It will be understood that the particular embodiments described above are only illustrative of the principles of the present invention, and that various modifications could be made by those skilled in the art without departing from the scope and spirit of the present invention, which is limited only by the claims that follow.

What is claimed is:

1. An apparatus for providing ground fault interruption in an electrical circuit comprising an insulated distributed resistive load in an overlapping relationship with a grounded conductive surface, where said resistive load forms a first plate of a parallel capacitor and said conductive surface forms a second plate of said capacitor and insulation of the insulated distributed resistive load is the dielectric of said capacitor, said apparatus comprising:

a. an electrical power source means for providing a load current to said resistive load;

b. a first sensing means for sensing said load current;

c. a second sensing means for sensing return current from said resistive load back to said electrical power source means;

d. a third sensing means for sensing capacitive leakage current between said resistive load and said conductive surface;

e. a conducting means for directing the flow of said capacitive leakage current to said third sensing means;

f. a first comparing means for comparing the value of said load current with the summation of the values of said return current and said leakage current;

g. a second comparing means for comparing the results of the first comparing means with a threshold current limit value; and h. control means for interrupting said load current if said results of said second comparing means exceeds said threshold current limit value;

whereby said load current is interrupted when a shock current exceeds said threshold current limit due to a ground fault condition.

2. The apparatus of claim 1 wherein said conducting means is a conducting shield layer substantially corresponding to the surface area of said resistive load.

3. An apparatus for providing ground fault interruption protection in an electrical circuit comprising a power source for supplying power to an electrothermal de-icing system comprising a distributed resistive heating element and installed in an overlapping relationship with a grounded aircraft conductive surface comprising:

a. a grounded shielding means interposed between said resistive heating element and said conductive surface, said shielding means having substantially the same surface area dimensions as said heating element;

b. a sensing transformer having a first primary for sensing load current to said heating element, a second primary for sensing return current from said heating element back to said power source and a third primary for sensing capacitive leakage current flowing from said heating element to said shielding means, said primaries phased so that the value of said load current is compared to the summation of said return current and said capacitive leakage current;

c. said sensing transformer further comprising a secondary which induces a control current proportional to the difference between said load current and the summation of said return current and said capacitive leakage current;

d. control means, having a threshold current limit value, for interrupting said load current if said control current exceeds said threshold current limit value;

whereby said load current is interrupted when a shock current exceeds said threshold current limit due to a ground fault condition.

4. An apparatus for providing ground fault interruption protection in an electrical circuit comprising a power source for supplying power to an electrothermal de-icing system comprising a distributed resistive heating element installed in an overlapping relationship with a grounded aircraft conductive surface comprising:

a. a current transformer for sensing load current to said heating element, return current from said heating element and capacitive leakage current between said heating element and said conductive surface, said current transformer comprising:

i. a first primary, a second primary, a third primary and a secondary, said first primary comprising a first wire conducting said load current, said second primary comprising a second wire conducting said return current, said third primary comprising a third wire conducting said capacitive current, and said secondary comprising a toroid coil through which said first, second and third wires pass through the center of said coil, whereby the resultant electrical signal output of said secondary is proportional to the difference between the value of said load current and the summation of said return current and said capacitive current;

b. a shield interposed between said heating element and said conductive surface for conducting the flow of said capacitive leakage current to said third primary; and c. a control circuit that compares said output of said secondary with a threshold current limit value and interrupts said load current when said output of said secondary exceeds said threshold;

whereby said load current is interrupted when a shock current exceeds said threshold current limit due to a ground fault condition.

5. A method for providing ground fault interruption in an electrical circuit comprising an insulated distributed resistive load in an overlapping relationship with a grounded conductive surface, where said resistive load forms a first plate of a parallel capacitor and said conductive surface forms a second plate of said capacitor and insulation of the insulated distributed resistive load is the dielectric of said capacitor, said method comprising:

a. sensing load current of said resistive load;

b. sensing return current from said resistive load;

c. interposing a grounded shield layer between said resistive load and said conductive surface;

d. sensing capacitive leakage current between said resistive load and said shield layer;

e. comparing the value of said load circuit with the summation of the values of said return current and said leakage current;

f. comparing the results of step (e) with a threshold current limit value; and g. interrupting said load current if said result of step (e) exceeds said threshold current limit value;

whereby said load current is interrupted when a shock current exceeds said threshold current limit due to a ground fault condition.

* * * * *